United States Patent
Gu et al.

(10) Patent No.: US 10,810,088 B1
(45) Date of Patent: Oct. 20, 2020

(54) SYSTEM AND METHOD OF DYNAMIC BACKUP POLICY GENERATION

(71) Applicant: Symantec Corporation, Mountain View, CA (US)

(72) Inventors: Lei Gu, Anaheim, CA (US); Ilya Sokolov, San Jose, CA (US)

(73) Assignee: NortonLifeLock Inc., Tempe, AZ (US)

( * ) Notice: Subject to any disclaimer, the term of this patent is extended or adjusted under 35 U.S.C. 154(b) by 869 days.

(21) Appl. No.: 15/154,373

(22) Filed: May 13, 2016

(51) Int. Cl.
*G06F 11/14* (2006.01)
*G06F 16/11* (2019.01)
*G06F 16/182* (2019.01)

(52) U.S. Cl.
CPC ...... *G06F 11/1461* (2013.01); *G06F 11/1464* (2013.01); *G06F 16/125* (2019.01); *G06F 16/184* (2019.01); *G06F 2201/80* (2013.01)

(58) Field of Classification Search
CPC .................................................. G06F 11/1461
See application file for complete search history.

(56) References Cited

U.S. PATENT DOCUMENTS

| | | | | |
|---|---|---|---|---|
| 7,330,997 B1* | 2/2008 | Odom | ................. | G06F 11/1464 711/162 |
| 8,776,168 B1* | 7/2014 | Gibson | ................. | H04L 63/104 709/225 |
| 9,317,686 B1* | 4/2016 | Ye | ........................ | G06F 11/1461 |
| 9,516,053 B1* | 12/2016 | Muddu | ................. | G06F 16/254 |
| 10,198,324 B2* | 2/2019 | Kottomtharayil | ....... | G06F 9/505 |
| 2004/0109436 A1* | 6/2004 | Vargas | ..................... | H04L 29/06 370/350 |
| 2005/0216527 A1* | 9/2005 | Erlingsson | ........... | G06F 11/1469 |
| 2007/0225962 A1* | 9/2007 | Brunet | ................ | G06F 11/1451 703/23 |
| 2008/0250072 A1* | 10/2008 | Nguyen | ............... | G06F 11/1435 |
| 2008/0256354 A1* | 10/2008 | Blumenau | ......... | G06F 17/30997 713/153 |
| 2010/0070475 A1* | 3/2010 | Chen | .................... | G06F 11/1451 707/640 |
| 2010/0162391 A1* | 6/2010 | Loveland | ............ | G06F 11/1461 726/22 |
| 2010/0186088 A1* | 7/2010 | Banerjee | ................. | G06F 21/51 726/23 |
| 2012/0089572 A1 | 4/2012 | Raichstein et al. | | |
| 2013/0325809 A1* | 12/2013 | Kim | .................... | G06F 11/1451 707/640 |

(Continued)

*Primary Examiner* — Dawaune A Conyers
(74) *Attorney, Agent, or Firm* — Maschoff Brennan (57) ABSTRACT

A system and method of dynamic backup policy generation based upon a user's behavior is provided. The method may include detecting a user's usage pattern of files within a computing system based upon the user's backup or restore activities. In some embodiments, the backup system may identify the files that have been modified and calculate the percentage of modification away from a predetermined baseline or another previously stored version. The system may generate a list of the identified files along with these percentages to form the user's usage pattern. The method may further include generating a user's profile including files having high access rates in accordance with this usage pattern and adjusting a backup policy based upon the user's profile such that these files are backed-up more frequently. The backup policy may also be adjusted based upon a detected level of risk associated with the user.

6 Claims, 5 Drawing Sheets

(56) References Cited

U.S. PATENT DOCUMENTS

| | | | |
|---|---|---|---|
| 2014/0188803 A1* | 7/2014 | James | G06F 11/1451 |
| | | | 707/638 |
| 2014/0201157 A1* | 7/2014 | Pawar | G06F 16/21 |
| | | | 707/654 |
| 2016/0140447 A1* | 5/2016 | Cohen | G06N 5/02 |
| | | | 706/52 |
| 2017/0177867 A1* | 6/2017 | Crofton | G06F 21/565 |

\* cited by examiner

SYSTEM AND METHOD OF DYNAMIC BACKUP POLICY GENERATION

BACKGROUND

The process of backing up data for most information technology systems comprises copying and archiving of computer data, such that it may be used to restore the original after a data loss event, including data deletion or corruption. A typical data retention policy includes a predetermined set of files along with how long the copies of data are required to be stored. In various systems, all users share the same backup policy. Albeit, a user can configure when and how often to backup their system. For example, a user can configure the backup utility to backup the files when the system is idle, backing up every 24 hours.

In conventional systems, however, these backup policies remain fixed, where a predetermined set of files are only backed up at predetermined times, which may be kept for a predetermined time. A user may be enabled to manually adjust backup settings; yet, the settings are not customizable. For example, the user may be able to determine what directories to backup and how often to backup files. However, the backup policy cannot be altered for any specific file or group of files. Additionally, there may exist certain users that perform high risk operations, exposing their computing system and others to corruption through malware. As a result, there are some files and/or systems that may need to be backed up more often than others, which may change over time. It is within this context that the embodiments arise.

SUMMARY

Embodiments of a system and method for dynamically adjusting a backup policy are provided. It should be appreciated that the present embodiment can be implemented in numerous ways, such as a process, an apparatus, a system, a device, or a method. Several inventive embodiments are described below.

In some embodiments, a system and method for backup processing based upon a user's usage of files is provided. The method may include detecting a user's usage pattern of files within a computing system based upon the user's backup or restore activities. In some embodiments, the backup system may identify the files that have been modified for a particular backup and calculate the percentage of modification away from a predetermined baseline or another previously stored version. The method may further include generating a list of the identified files along with these percentages to form the user's usage pattern. From this usage pattern, the method may include generating a user's profile that identifies files having high access rates and adjusting a backup policy based upon the user's profile such that the frequently accessed and modified files are backed-up more frequently. In some embodiments, the backup policy may also be adjusted based upon a detected level of risk associated with the user.

In some embodiments, a storage controller is provided. The storage controller may include a memory and a processor operable to detect a user's usage pattern of files within a computing system based upon the user's backup or restore activities. For the detecting feature, the processor may be operable to access the user's backup activities identifying files that have been modified for particular backup and calculate the percentage of modification away from a predetermined baseline or another previously stored version. The processor may further be operable to generate a list of identified files along with these percentages to form the user's usage pattern. From this usage pattern, the processor may also be operable to generate a user's profile including highly accessed files and adjust the backup policy based upon the user's profile, such that the frequently accessed and modified files are backed-up more frequently. Moreover, the processor may be configured to detect the level of risk associated with the user and to adjust the backup policy based upon the detected level of risk.

In some embodiments, a tangible, non-transitory, computer-readable media having instructions whereupon which, when executed by a processor, cause the processor to perform the back of processing method described herein. The method may include detecting a user's usage pattern of files within a computing system based upon the user's backup or restore activities. In some embodiments, the backup system may identify the files that have been modified for a particular backup and calculate the percentage of modification away from a predetermined baseline or another previously stored version. The method may further include generating a list of the identified files along with these percentages to form the user's usage pattern. From this usage pattern, the method may include generating a user's profile that identifies files having high access rates and adjusting a backup policy based upon the user's profile such that the frequently accessed and modified files are backed-up more frequently. In some embodiments, the backup policy may also be adjusted based upon a detected level of risk associated with the user.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

The following embodiments describe a system and method for providing a dynamic backup service based upon the user's behavior. It can be appreciated by one skilled in the art, that the embodiments may be practiced without some or all of these specific details. In other instances, well known process operations have not been described in detail in order not to unnecessarily obscure the embodiments.

The system and method for backup processing may include a backup agent installed on the computing device that tracks the user's file pattern usage and dynamically adjusts a backup policy based upon this usage pattern. The backup agent may include software instructions and/or hardware logic required for detecting the usage pattern and adjusting backup policies. The instructions or method may include detecting the user's usage pattern of files within the computing system based upon the user's backup or restore activities. In some embodiments, the backup system may identify the files that have been modified for a particular backup and calculate the percentage of modification away from a predetermined baseline or another previously stored version. The method may further include generating a list of the identified files along with these percentages to form the user's usage pattern. Based upon the usage pattern, the method may also include generating a user's profile including files having high access rates and adjusting the backup policy based upon the user's profile, such that frequently accessed and modified files are backed-up more frequently than other files. In another embodiment, the backup policy may also be adjusted based upon a detected level of risk associated with the user.

Using the system and method of backup service described herein, not only can the user adjust backup settings including what directories to backup and how often to backup files; but also, the system can automatically adjust the backup policy based upon user's usage pattern. That is, as the user's usage pattern changes over time, the system dynamically changes the backup policy in accordance with the user's modification of particular files. For example, the system can backup more often those files having high access rates and high modification percentage rates. As an additional feature, the system can dynamically change the backup policy to perform backups more frequently for users exhibiting a high level of risk. For example, the system can detect whether a particular user tries to search suspect websites or has a bad reputation of selecting hyperlinks, which open malware and other types of security evasive programs. The system can also detect whether the user performs high risk operations and dynamically adjust the backup policy based upon these operations.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
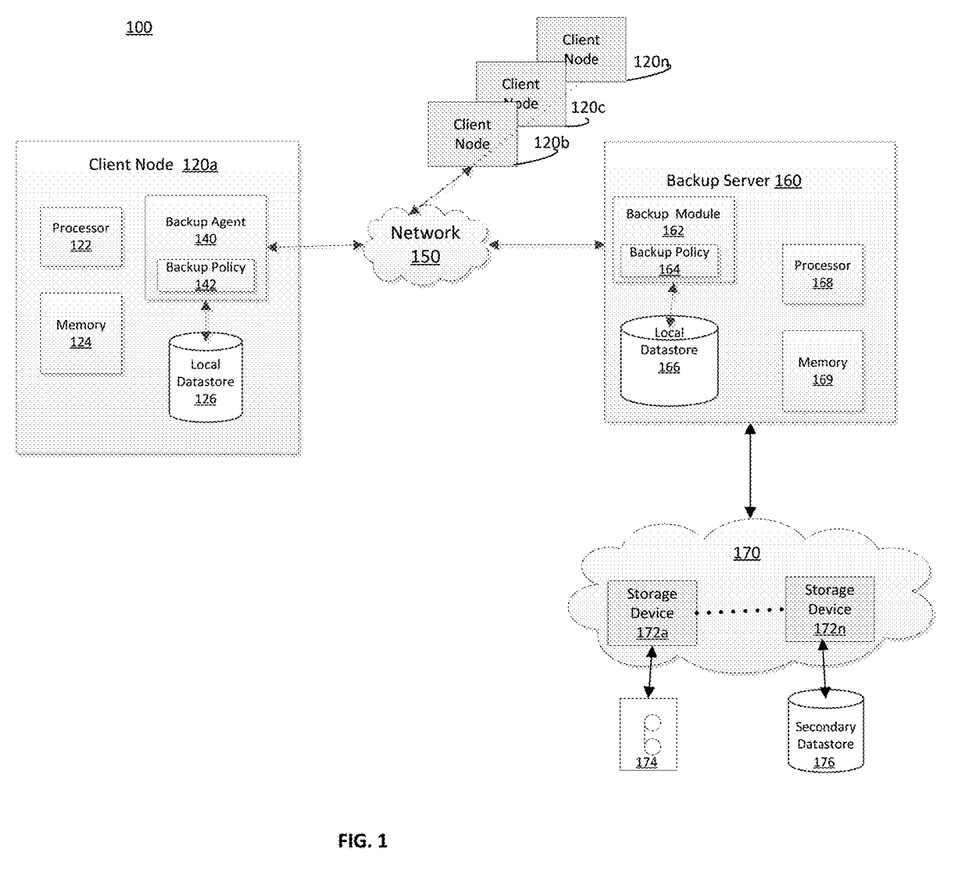
FIG. 1 is a perspective view of a backup storage system having dynamic backup policy generation, including a backup server and multiple storage nodes, in accordance with some embodiments.

Referring to FIG. 1, an exemplary perspective view of a backup storage system having dynamic backup policy generation, including a backup server and multiple storage nodes, in accordance with some embodiments is shown. The system includes at least one client node 120*a-n*, a network 150, at least one backup server 160, and a plurality of secondary storage devices 172, 174, and 176. Client nodes 120*a-n*, with local data store 126, are coupled by a network 150 to a backup server 160 having remote storage device 142*a-n*. Each client node 120*a-n* includes a backup agent 140, memory 124, a processor 122, and local data store 126. Examples of the client nodes 120*a-n* may include, but are not limited to, personal computers, laptops, PDAs, mobile phones, network appliances, and the like. The backup agent 140 may serve as a device that communicates with the backup server 160 to perform the method of dynamic backup policy generation described more in detail below. The client nodes 120*a-n*, backup server 160, and the storage devices 172*a-n* may reside on the same LAN, or on different LANs that may be coupled together through the Internet, but separated by firewalls, routers, and/or other network devices. In one embodiment, client nodes 120*a-n* may couple to network 150 through a mobile communication network. In another embodiment, the client nodes 120a-n, backup server 160, and the storage devices 172a-n may reside on different networks. Although not shown, in various embodiments, the client node 120a-n may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

The backup server 160 may comprise a processor 168, memory 169, and backup module 162. The backup module 162 may comprise processing software instructions and/or hardware logic required for dynamic backup policy generation according to the embodiments described herein. The backup server 160 may provide remote storage capabilities through the storage devices 172a-n coupled by network 170. In some embodiments, the storage devices 172a-n may be storage devices of a cloud network system 170. In the alternative, the storage devices 172a-n may be remotely connected to backup server 160. Further, these storage devices 17a-n may couple to one or more tape-out devices 174 or any other secondary datastore 176. The backup server 160 may also comprise a local data storage unit 126, which can be one or more centralized data repositories having mappings of respective associations between each fragment data and its location within a remote storage devices 172a-n. The local data store 166 may represent a single or multiple data structures (databases, repositories, files, etc.) residing on one or more mass storage devices, such as magnetic or optical storage based disks, tapes or hard drives. Although the data store 166 is illustrated as being an internal component of the backup server 160, data store 166 may couple externally to backup server 160, or remotely through a network. The backup server 160 can communicate with the remote storage devices 172a-n over a public or private network. Although not shown, in various embodiments, the backup server 160 may be a NetBackUp (NBU) Appliance (5330 Appliance), a notebook computer, desktop computer, microprocessor-based or programmable consumer electronics, network appliance, mobile telephone, smart telephone, radio frequency (RF) device, infrared (IR) device, Personal Digital Assistant (PDA), set-top box, an integrated device combining at least two of the preceding devices, and the like.

As previously noted, the system may include remote data storage units and tape-out devices coupled by a network to client nodes 120a-n. As such, backup policies may be stored within the local data store (126, 166), remote disks 172a-n, secondary data store 176, or tape-outs devices 174. In some embodiments, the backup policies may be retrieved initially from a remote datastore to a local one. In other embodiments, the backup policies may be stored locally on the client node 120a-n or the backup server 160.

In operation, the backup agent 140 can build a profile of preferred files for each user, based upon the user's backup and/or restore activities. A preferred file may be a file that is unique to the user. Any file that has been modified by the user may represent a preferred file. The backup agent 140 may interpret that a larger amount of modifications made by the user to a file indicates that the file is a preferred one. In some embodiments, an empty Word® document or a copied image may represent a baseline. Accordingly, any modification to the document or the image can represent a deviation away from the baseline. The backup agent 140 may calculate this deviation. The greater the deviation from the baseline, the backup agent 140 can interpret that the file is more preferred by the user. Based upon this calculation of the deviation, the backup agent 140 can generate a list of the most preferred files on the user's system and adjust backup policies based on these files. In some embodiments, the backup agent 140 can also interpret that a file that the user has downloaded or copied from another media or drive cannot be a preferred file. For preferred files, in some embodiments, the backup agent 140 can suggest that the user subscribe to multiple online backup service providers to backup these types of files, using the graphical user interface (GUI, not shown).

The backup agent 140 may also track preferred files of the user based upon the type of files the user edits or restores over and above an average. In another embodiment, the backup agent 140 can detect whether a user mostly copies a set of images and videos from an external drive (like a camera or small phone); modifies these; and deletes the original transferred copies. The backup agent 140, for example, can further detect whether the user makes modifications and deletes a large percentage. For example, the backup agent 140 can detect that the user removes 90% of the original files after the user has modified the files it received from the external source. The backup agent 140 can adjust the backup policy 142, such that a backup is scheduled to wait the average time for the user to remove the original files before backing up the modified 10% of files. In one example, the backup agent 140 can detect the probability of an image file being modified or deleted after one hour. Accordingly, the backup agent 140 can adjust the backup policy 142 to only backup the image file after an hour has passed.

Upon detection of a level of risk associated with the user (based upon user's online browsing and block history), the backup agent 140 may also build the user's usage profile based upon the level of risk associated with a user. For example, if the user accesses a large amount of suspect web sites, clicks on a lot of bad reputation links, or opens up suspicious email attachments, the backup agent 140 can deem this user a high risk and, hence, more likely to be attacked by malware. The system 100 may maintain a database of malicious (bad) links in either the local data store units (126, 166) or the remote data store (172, 174, 176). However, since this list is not ubiquitous, the system may only serve to protect the client from potential bad links. Based upon the user's behavior, this system and method assumes that there is a greater chance that this high level risk user may click on an unknown bad link more than a lower or average risk user. Accordingly a high level risk user may need to perform more backups and restores.

The backup agent 140 may examine the user's usage profile and adjust the user's backup policy in the following areas. First, regarding high risk users, the backups having new updates may be backed up to a temporary location and overriding existing backups. After a predetermined period of time has passed, the new location can be merged back with the main version. When the user eventually requests a restore due to a security attack, the backup agent 140 can then discard the entire temporary area. Second, the backup agent 140 may adjust the backup frequency. For example, the backup agent 140 may adjust the backup policy to a slower frequency for users that always copy, modify and delete image files from external drives (i.e. backup once every couple of hours). Further, the backup agent 140 may adjust the time of the day. For example, the backup agent 140 may detect whether the user usually participates in a large amount of high risk activities in the morning when the user reads email, opens up attachments, and browser personal web sites. Accordingly, the backup agent 140 may adjust the backup policy to backup a predetermined set of files during the morning hours (e. g. 7 am-10 am). The backup agent 140 may also detect the presence of Virtual Private Network (VPN) and classify the user's activity as business. Thereby, the backup agent 140 may adjust backup policy to more frequently backup the files that the user modifies while the VPN session is instituted.

In some embodiments, the backup agent 140 may communicate with the backup module 162, indicating which backup policies 142 has been modified. The backup module 162 can coordinate the adjustment of the backup policies 164 in light of backup policies 142. In some embodiments, the backup module 162 may perform many of the tasks that there backup agent 140 functions to perform. That is, the backup module 162 may dynamically adjust its backup policy 164 based upon the user's backup history, restore history, level of risk, and frequency of modification.

It is appreciated that the components of exemplary operating environment 100 are exemplary and more or fewer components may be present in various configurations. It is appreciated that operating environment may be part of a distributed computing environment, a cloud computing environment, a client server environment, and the like.

In other words, as would be apparent to one of ordinary skill in the art after reading this description, the various features and functionality described herein may be implemented in the system's architecture using any arrangement components necessary to perform the backup service delivery and other backup features (and functionality); and can be implemented in one or more separate or shared modules in various combinations and permutations. Further, the method of providing dynamic backup processing may be used for any storage stack, whether primary or secondary storage.

Figure 2:
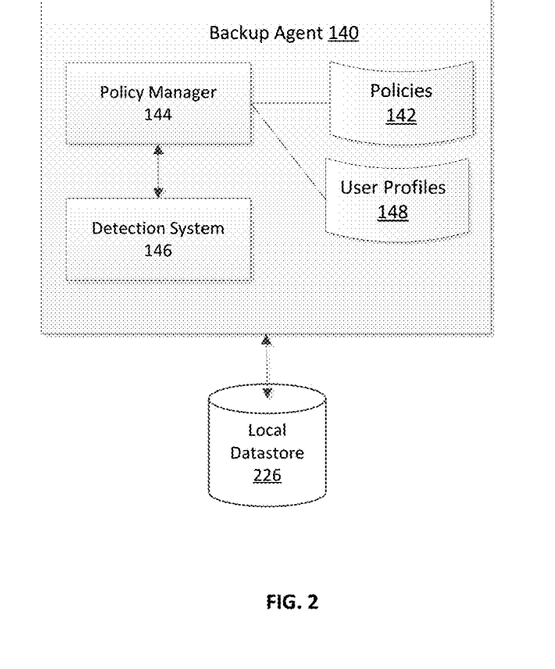
FIG. 2 is a diagram of backup agent having backup policies, which can be implemented in any computing device of FIG. 1 as a storage resource in some embodiments.

FIG. 2 is a diagram of backup agent having backup policies, which can be implemented in any client node of FIG. 1 in some embodiments. The backup agent 140 may comprise a policy manager 144, backup policies 142, user profiles 148, and a detection system 146. The policy manager 144 can use the detection system 146 to generate each user's profile. In some embodiments, the detection system 146 can monitor all files and identify a percentage of modification and access rate associated with each file. The detection system 146 may generate an ordered list of these files. The policy manager 144 in collaboration with the detection system 146 may select files having a predetermined access rate or modification percentage. Further, the policy manager 144 may list these files in the user's profile 148. Accordingly, the policy manager 144 can adjust the backup policies 142 based upon the user's profile 148.

The policy manager 144 may also use the detection system 146 to classify whether the user is a high level risk or not. For example, the detection system 146 can monitor the user's behavior, identifying whether the user has a bad reputation of searching suspect websites or selecting hyperlinks, which open malware and other types of security evasive programs. When the detection system 146 detects that the user is a high risk, the policy manager 144 can modify the backup policy 142 to increase frequency of backups for the system related to this particular user.

In some embodiments, the policy manager 144 can use the detection system 146 to determine if the user has accessed files from an external source. The backup agent 140 may monitor whether these accessed files are modified by the user and then later removed. The backup agent 140 can determine an average percentage of the removal of these access files. For example, the detection system 146 may couple to the processor 122 of the client node 122 to monitor the user's behavior. When the user transfers files from an external source, the detection system 146 may monitor the number of files that are modified and the number of files that are ultimately deleted in an effort to determine the average percentage of files that need to be backed-up. For example, if the user typically retrieves, modifies, and deletes images from an externally coupled mobile device, the detection system 146 can detect the average amount of time it takes to remove these files. If the detected average time is one hour, the policy manager 144 can modify the backup policy 142 to wait a time greater than an hour before initiating a backup of the system.

Figure 3:
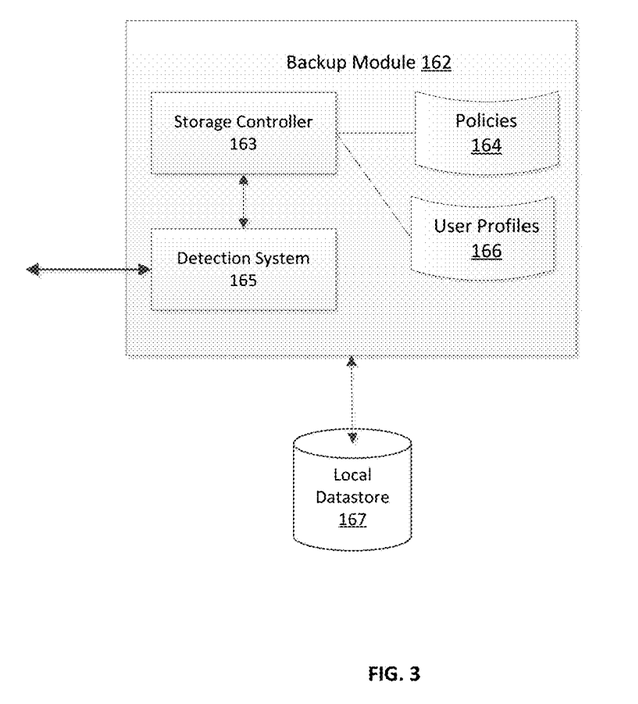
FIG. 3 is a diagram of backup module having backup policies, which can be implemented in the backup server of FIG. 1 in some embodiments

FIG. 3 is a diagram of backup module 162 having backup policies, which can be implemented in the backup server of FIG. 1 in some embodiments. Similar to the backup agent 140, the backup module 162 may include backup policies 164 and user profiles 166. A storage controller 163 may also serve to perform backups based upon policies that have been adjusted by the user profile 166. Liken unto the policy manager in the backup agent 140, the storage controller 163 can use a detection system 165 to generate each user's profile remotely. In some embodiments, the detection system 165 can remotely monitor all files on any of the client nodes 120a-n and identify a percentage of modification and access rate associated with each file. The detection system 165 may generate an ordered list of these files. The storage controller 163 in collaboration with the detection system 165 may select files having a predetermined access rate or modification percentage. Further, the storage controller 163 may list these files in the user's profile 166. Accordingly, the storage controller 163 can adjust the backup policies 164 based upon the user's profile 166.

The storage controller 163 may also use the detection system 165 to classify whether the user is a high level risk or not. For example, the detection system 165 can remotely monitor the user's behavior, identifying whether the user has a bad reputation of searching suspect websites or selecting hyperlinks, which open malware and other types of security evasive programs. When the detection system 165 detects that the user is a high risk, the storage controller 163 can modify the backup policy was 64 to increase frequency of backups for the system related to this particular user.

In some embodiments, the storage controller 163 can use the detection system 165 to determine if the user has accessed files from an external source, modifying and removing these files at an average percentage. For example, the detection system 165 may remotely couple to a processor 122 of any one of the client nodes 120a-n to monitor the user's behavior. When the user transfers files from an external source, the detected system 165 may monitor the number of files that are modified and the number of files that are ultimately deleted in an effort to determine the average percentage of files that need to be backed-up. For example, if the user typically retrieves, modifies, and deletes images from an externally coupled mobile device, the detection system 165 can detect the average amount of time that it takes to remove a predetermined percentage of these files. If the detected average time is one hour, the storage controller 163 can modify the backup policy 164 to wait a time greater than an hour before initiating a backup of the system.

Figure 4A:
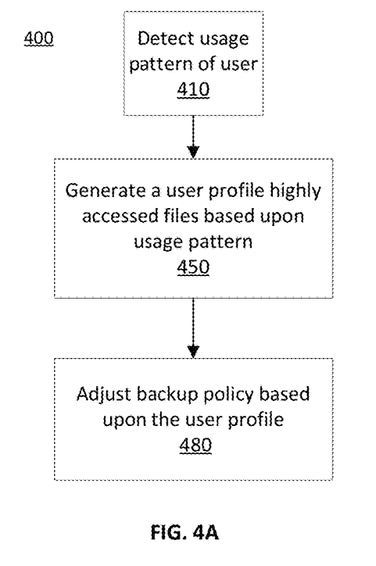
FIG. 4A is a flow diagram of a method for backup processing in accordance with some embodiments.
Figure 4B:
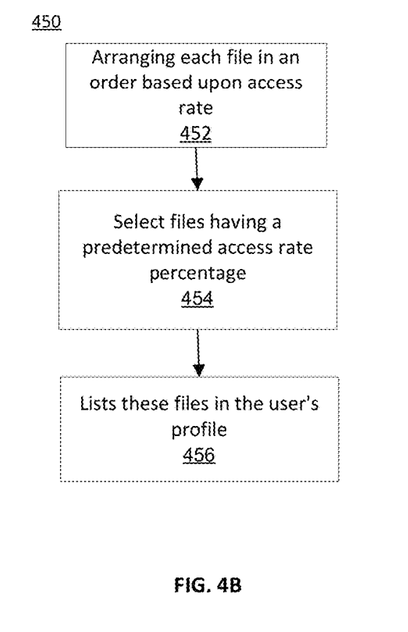
FIG. 4B is a flow diagram of a method for detecting a user's usage pattern of FIG. 4A, in accordance with some embodiments.

FIG. 4A is an exemplary flow diagram of a method for backup processing 400 in accordance with some embodiments. In an action 410, the dynamic backup policy generation system 100 may detect the usage pattern of the user. For example, as shown in FIG. 4B, which represents a flow diagram of a method for detecting a user's usage pattern of FIG. 4A (in accordance with some embodiments), the backup agent 140 may access the user's backup or restore activity, in an action 412. The backup agent 140, in action 414, may identify each file associated with user modification from the user's backup or restore activities. The backup agent 140 can detect a percentage of modification distinguished from a baseline, in an action 416. For example, the backup agent 140 may detect the percentage of modification that has been made to an empty document or a previous version. In an action 418, the backup agent 140 can generate a list of the files that form this usage pattern.

Figure 4C:
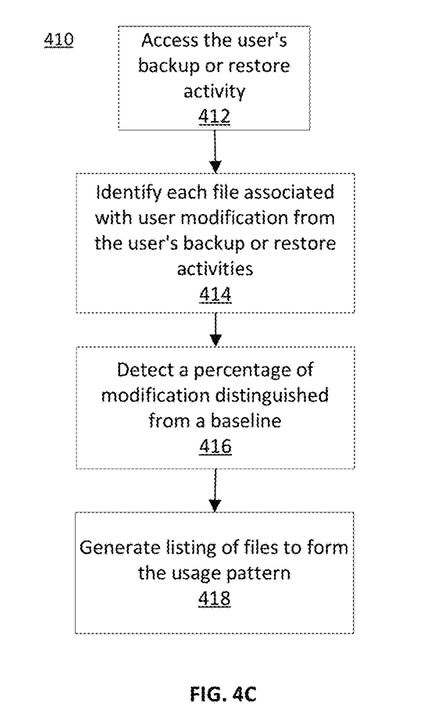
FIG. 4C is a flow diagram of a method for generating a user's profile of FIG. 4A, in accordance with some embodiments.

Referring back to FIG. 4A, the dynamic backup policy generation system 100 may also generate a user profile of highly access files based upon the detected usage pattern, in an action 450. For example, as shown in FIG. 4C, which represents a flow diagram of a method for generating a user's profile of FIG. 4A (in accordance with some embodiments), the backup agent 140 can arrange each file in an order based upon the access rate, in an action 452. The backup agent 140, in an action 454, can select files having a predetermined access rate percentage. Further, the backup agent 140 may list these files in the user's profile, in an action 456.

Figure 4D:
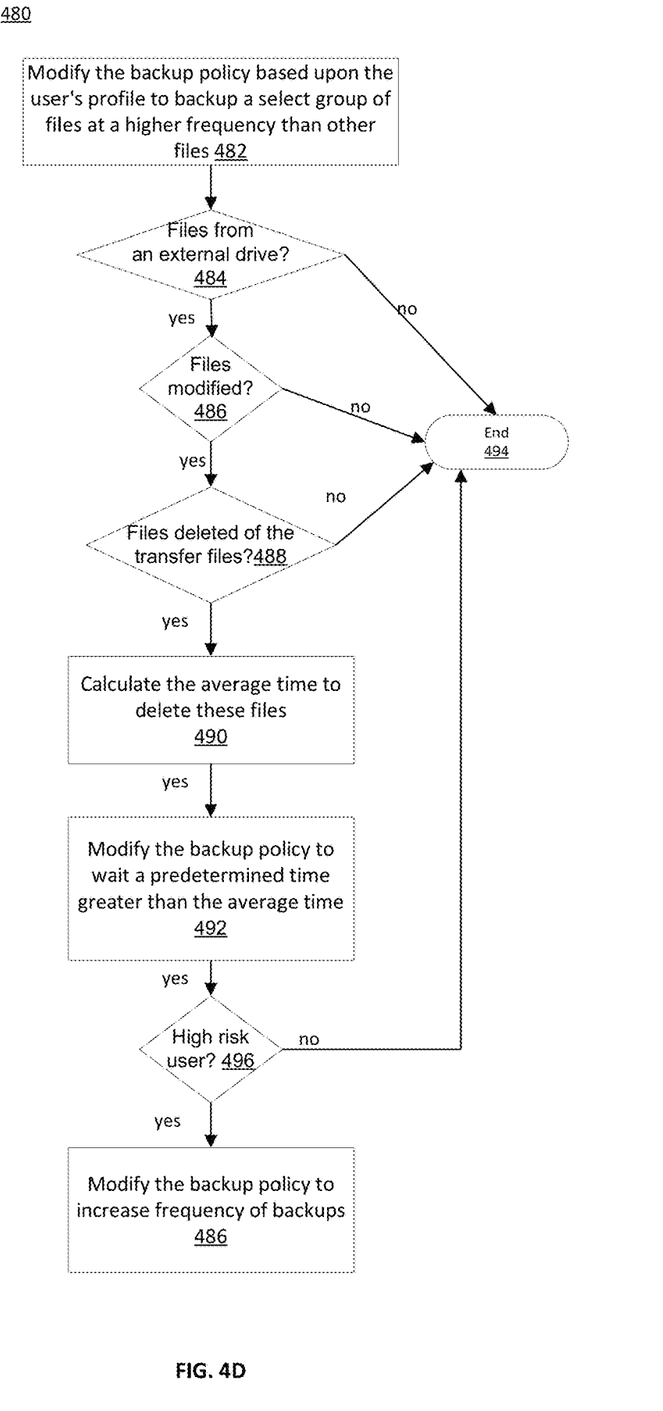
FIG. 4D is a flow diagram of a method for adjusting a backup policy of FIG. 4A, in accordance with some embodiments.

Referring back to FIG. 4A, the dynamic backup policy generation system 100 can adjust the backup policy based upon the user's profile, in an action 480. For example, as shown in FIG. 4D, which represents a flow diagram of a method for adjusting a backup policy of FIG. 4A (in accordance with some embodiments), the backup agent 140 can modify the backup policy based upon the user's profile to backup a select group of files at a higher frequency than other files, in an action 482. The backup agent 140 can also detect whether the file was previously retrieved from an external drive, in a decision action 484. When the file was previously retrieved from an external drive, the backup agent 140 may also detect whether the file was modified, in a decision action 486. When the file was modified, the backup agent 140 may further detect whether a detected set of files have been removed from the files that were transferred from the external file, in decision action 488. If a detected set of files have been removed, the backup agent 140 can calculate the average time to delete these files, in an action 490. The backup agent 140, in an action 492, and modify the backup policy to wait a predetermined time greater than an average time. For example, if the user typically retrieves, modifies, and deletes images from an externally coupled mobile device, the backup agent can detect the average time to delete a predetermined percentage of files. If the detected average time is an hour, the backup agent 140 can modify the backup policy to wait a time greater than an hour before initiating a backup of the system. The backup agent 140, in a decision action 496, may also detect whether the user is a high risk user. For example, the backup agent 140 can monitor the user's behavior, identifying whether the user has a bad reputation of searching suspect websites or selecting hyperlinks, which open malware and other types of security evasive programs. When the backup agent 140 detects that the user is a high risk, the backup agent 140 can modify the backup policy to increase frequency of backups for the system related to this particular user, in an action 486.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 5:
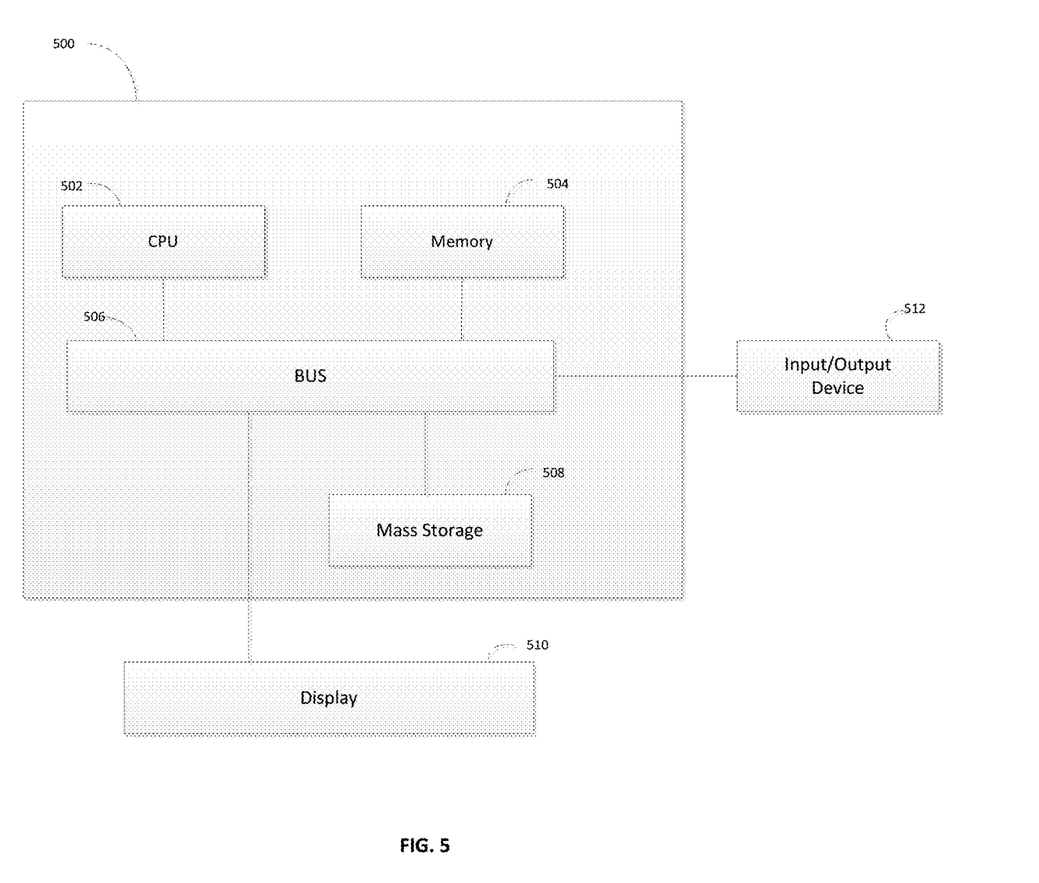
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for performing the dynamic backup policy generation in accordance with some embodiments. The computing device includes a central processing unit (CPU) 502, which is coupled through a bus 506 to a memory 504, and mass storage device 508. Mass storage device 508 represents a persistent data storage device such as a floppy disc drive or a fixed disc drive, which may be local or remote in some embodiments. The mass storage device 508 could implement a backup storage, in some embodiments. Memory 504 may include read only memory, random access memory, etc. Applications resident on the computing device may be stored on or accessed through a computer readable medium such as memory 504 or mass storage device 508 in some embodiments. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some embodiments.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1-4D. The code embodying this functionality may be stored within memory 504 or mass storage device 508 for execution by a processor such as CPU 502 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for dynamically adjusting a backup policy comprising:
    detecting a first group of files uploaded by a user from a first external source to a computing device;
    monitoring the user's behavior to identify a first amount of time required for the user to delete a predetermined percentage of the first group of files from the computing device, wherein the first amount of time starts when the first group of files is uploaded to the computing device and ends when the user deletes the predetermined percentage of the first group of files from the computing device;
    detecting a second group of files uploaded by the user from a second external source to the computing device;
    monitoring the user's behavior to identify a second amount of time required for the user to delete the predetermined percentage of the second group of files from the computing device, wherein the second amount of time starts when the second group of files is uploaded to the computing device and ends when the user deletes the predetermined percentage of the second group of files from the computing device;
    averaging the first and second amounts of time to determine an average amount time required for the user to delete the predetermined percentage of the first and second groups of files from the computing device; and
    dynamically adjusting the backup policy for the computing device such that when files are uploaded to the computing device from an external source, a time greater than the average amount time required for the user to delete the predetermined percentage of the first and second groups of files from the computing device is avowed to pass before initiating a backup of the computing device.

2. The method of claim 1, wherein the first and second groups of files are uploaded from the same external source.

3. The method of claim 1, wherein at least one of the first and second external sources is a mobile phone.

4. The method of claim 1, wherein at least one of the first and second external sources is a camera.

5. The method of claim 1, wherein the predetermined percentage is 90%.

6. A method for dynamically adjusting a backup policy comprising:
    identifying the presence of a Virtual Private Network (VPN) on a computing device;
    determining the initiation of a VPN session on the computing device;
    classifying a user's activity during the VPN session as business related; and
    dynamically adjusting the backup policy of the computing device such that files modified during the VPN session are backed up more frequently during the VPN session than files modified when the VPN session has not been instituted.

* * * * *